(Model.)

W. F. SHUTER.
STOVE COVER LIFTER.

No. 261,393. Patented July 18, 1882.

WITNESSES:

INVENTOR:
W. F. Shuter
BY Munn & Co
ATTORNEYS.

UNITED STATES PATENT OFFICE.

WILLIAM F. SHUTER, OF MANISTEE, MICHIGAN.

STOVE-COVER LIFTER.

SPECIFICATION forming part of Letters Patent No. 261,393, dated July 18, 1882.

Application filed March 20, 1882. (Model.)

*To all whom it may concern:*

Be it known that I, WILLIAM F. SHUTER, of Manistee, Manistee county, Michigan, have invented a new and Improved Stove-Cover Lifter, of which the following is a full, clear, and exact description.

This invention consists of a combination implement having such construction that it is adapted to be used as a lifter for stove-covers, pots, and bake pans or plates, and as a tack puller and hammer, and as a glazier's tool for setting window-glass, and also as a can-opener.

Reference is to be had to the accompanying drawings, forming a part of this specification, in which similar letters of reference indicate corresponding parts in both the figures.

Figure 1:
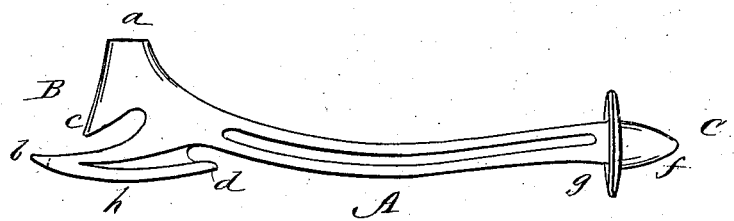
Figure 2:
Figure 2:
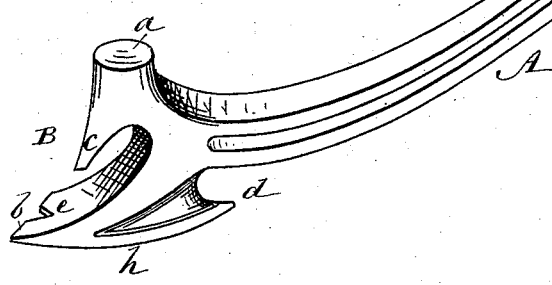

Figure 1 is a side elevation of my invention, and Fig. 2 is a perspective view thereof.

A represents the implement, which is cast in the form shown in the drawings, with the head B and pointed outer end, C. The head B is formed with the hammer-face $a$, the lip $c$, and the extended toe $b$, and the hook $d$. The toe $b$ is slotted, as shown at $e$, to form claws for adapting the implement for pulling tacks. The outer end, C, of the implement is formed with the rounded point or blade $f$, which is adapted for making the openings in window-sash for the insertion of the sheet-metal points used for holding the glass. The distance of insertion in the sash of the blade $f$ is limited by the flange or stop $g$, which is formed on or attached to the implement the proper distance from the end of the point $f$, as clearly shown in the drawings. The point $f$ is also convenient for use in opening cans containing preserved meats, vegetables, &c., the point being entered through the can and the edge of the lip $g$ utilized as a fulcrum for gradually severing the metal of the can by the point, as will be readily understood. The hook $d$ adapts the implement for lifting pots, kettles, and similar things which have bails. The toe $b$ adapts the implement for lifting stove-covers, and this toe, in connection with the lip $c$, adapts the implement for lifting bake-pans, pie-tins, or plates. Between the point of the toe $b$ and the hook $d$ the implement has the form of a curve, as shown at $h$, which, in connection with the slot $e$, adapts the implement for easily and conveniently pulling tacks, and the face $a$ adapts the implement for use as a tack-hammer.

By this construction of the implement it will be seen that the implement is cheap, durable, and well adapted for all of the uses mentioned.

Having thus described my invention, I claim as new and desire to secure by Letters Patent—

As an article of manufacture, the implement made, substantially as herein shown and described, with the toe $e$, hook $d$, lip $c$, and hammer-face $a$ at one end and the blade $f$ and stop $g$ at the other, as set forth.

WILLIAM FITZROY SHUTER.

Witnesses:
   A. O. WARD,
   NELLIE G. SECOR.